United States Patent [19]

Kino

[11] Patent Number: 5,689,480
[45] Date of Patent: Nov. 18, 1997

[54] MAGNETO-OPTIC RECORDING SYSTEM EMPLOYING NEAR FIELD OPTICS

[75] Inventor: Gordon S. Kino, Stanford, Calif.

[73] Assignee: The Board of Trustees of the Leland Stanford Junior University, Palo Alto, Calif.

[21] Appl. No.: 696,168

[22] Filed: Aug. 13, 1996

[51] Int. Cl.$^6$ ............................................. G11B 13/00
[52] U.S. Cl. .......................... 369/14; 369/13; 369/112
[58] Field of Search ............................ 369/14, 13, 126, 369/112; 250/227.26, 216, 306

[56] References Cited

U.S. PATENT DOCUMENTS 4,581,529  4/1986  Gordon ............................ 369/32
5,218,582  6/1993  Marchant ......................... 369/14
5,245,491  9/1993  Horie et al. ...................... 369/13
5,288,998  2/1994  Betzig et al. ................ 250/227.26
5,343,460  8/1994  Miyazaki et al. ................ 369/126
5,389,779  2/1995  Betzig et al. ..................... 250/306

*Primary Examiner*—Tan Dinh
*Attorney, Agent, or Firm*—Flehr Hohbach Test Albritton & Herbert

[57] ABSTRACT

A magneto-optic recording system employing near-field optics which includes a read/write head having a pair of crossed tapered optical waveguides closely adjacent to the recording medium to provide light coupling between the tapered ends of the waveguides and the recording medium. The length of the waveguides being greater than one-half the wavelength of the light transmitted by the waveguides to transmit all light entering the waveguide to the tapered end and the width being a fraction of a wavelength of the light.

17 Claims, 5 Drawing Sheets

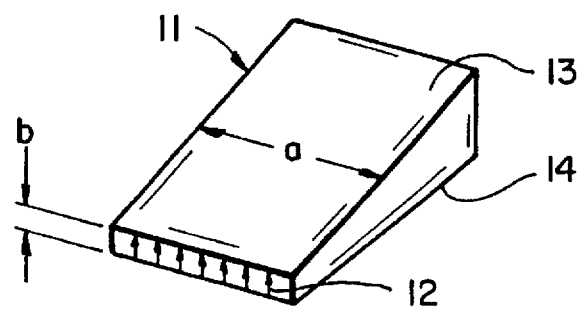
FIG_1
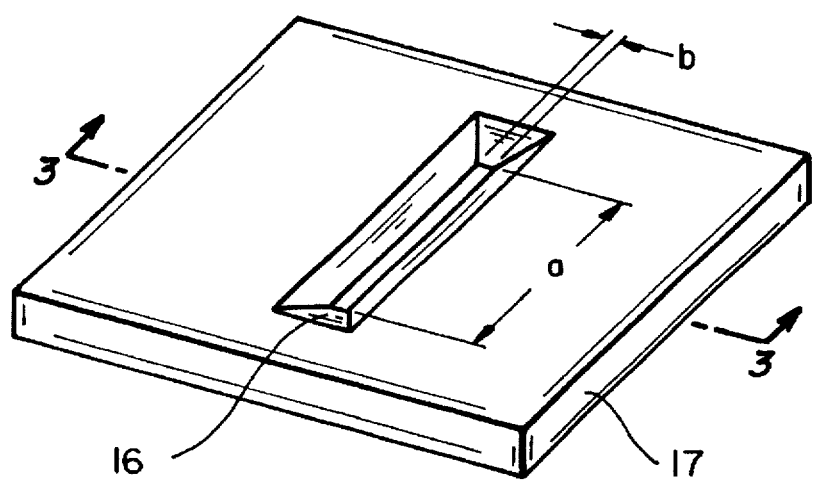
FIG_2
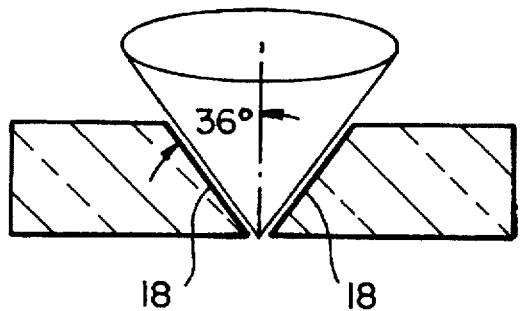
FIG_3A
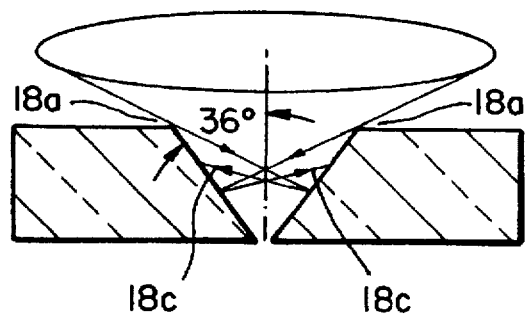
FIG_3B

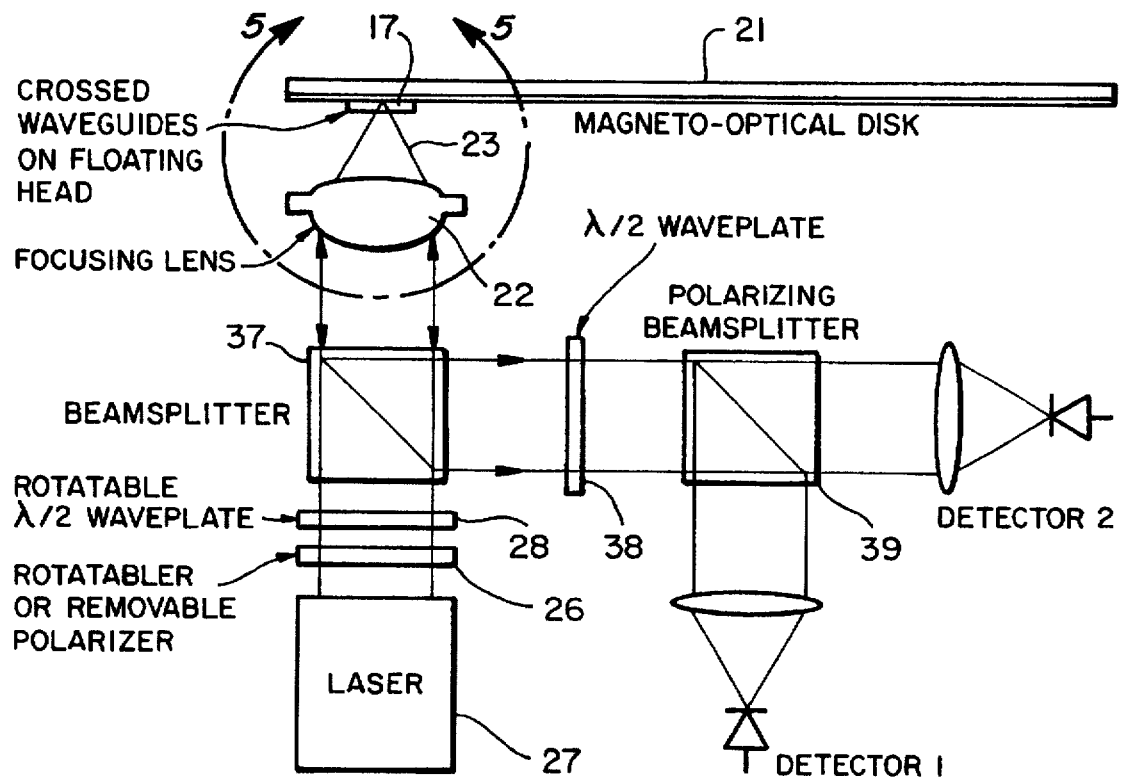
FIG_4
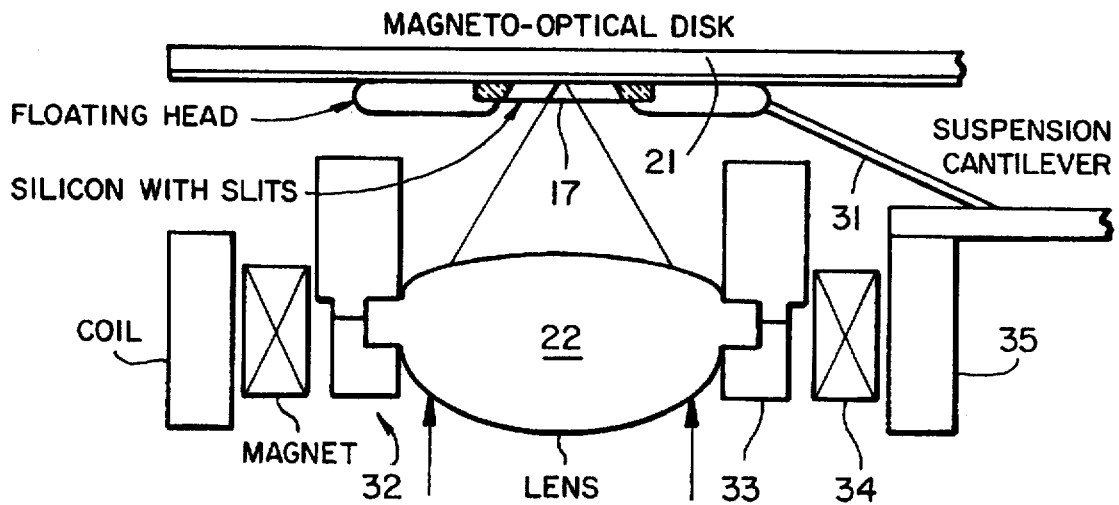
FIG_5

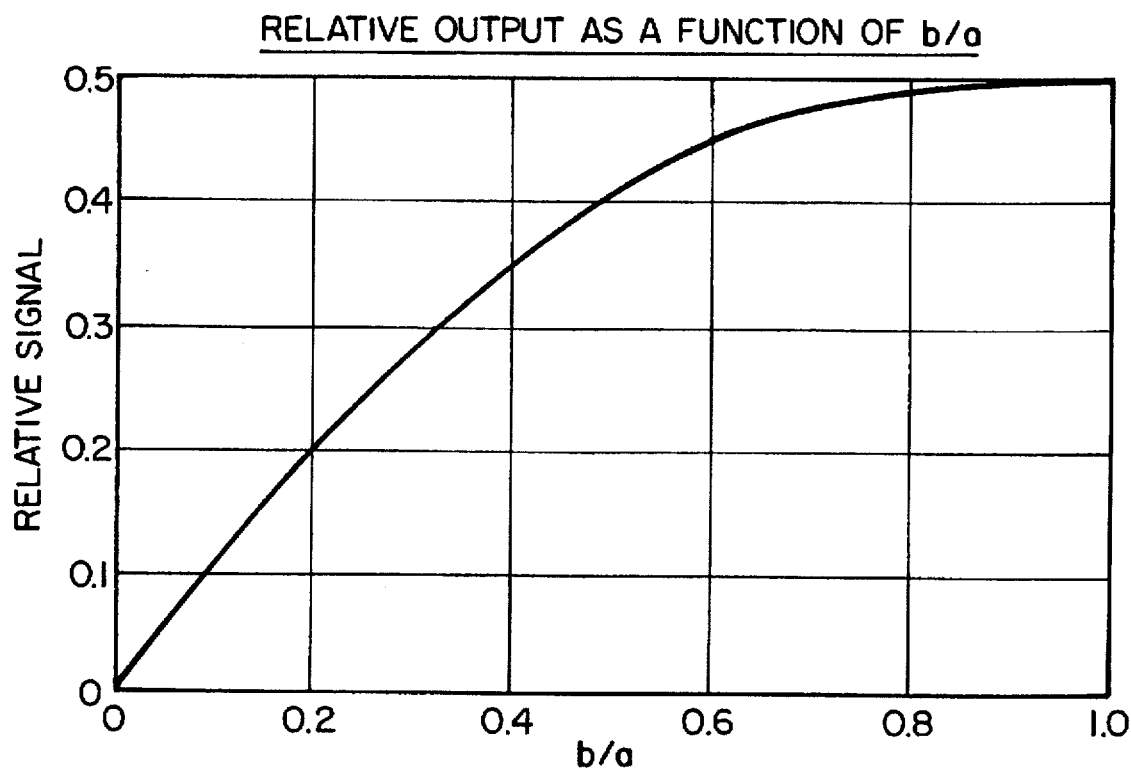
FIG_6
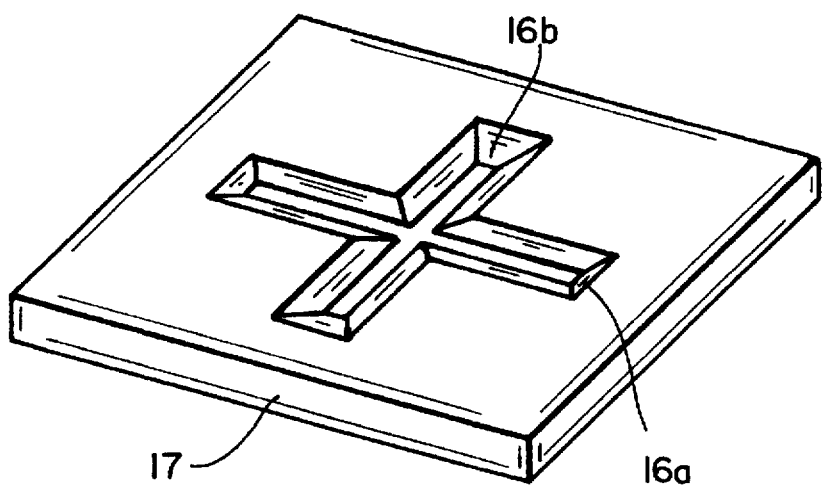
FIG_7

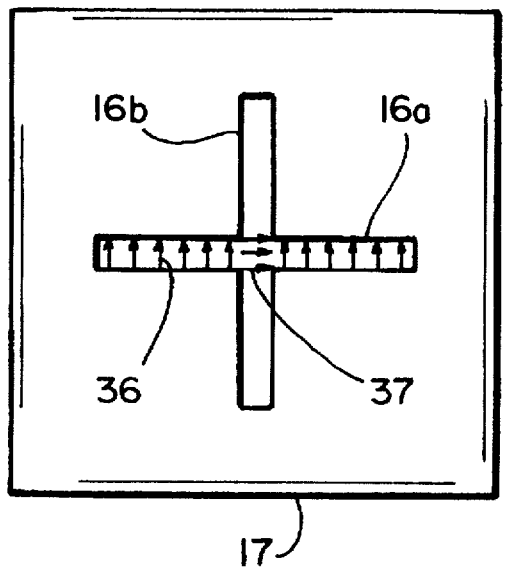
FIG_8
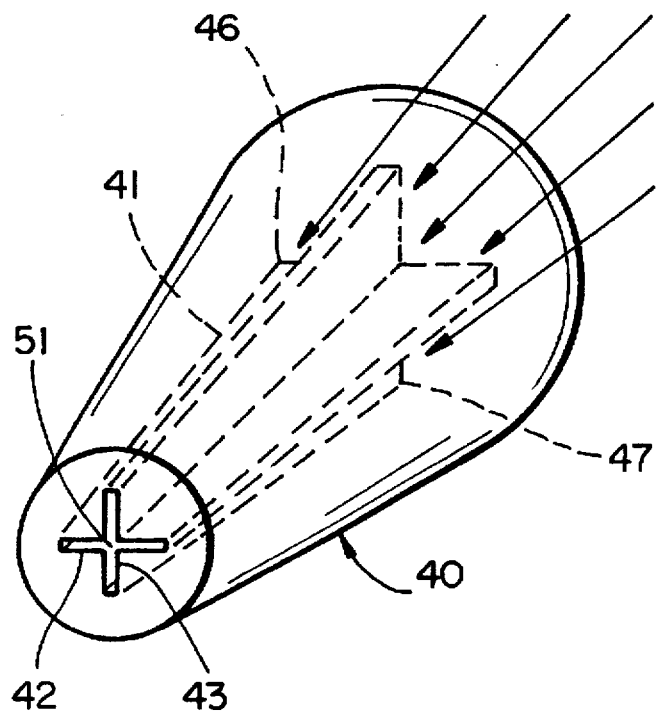
FIG_9

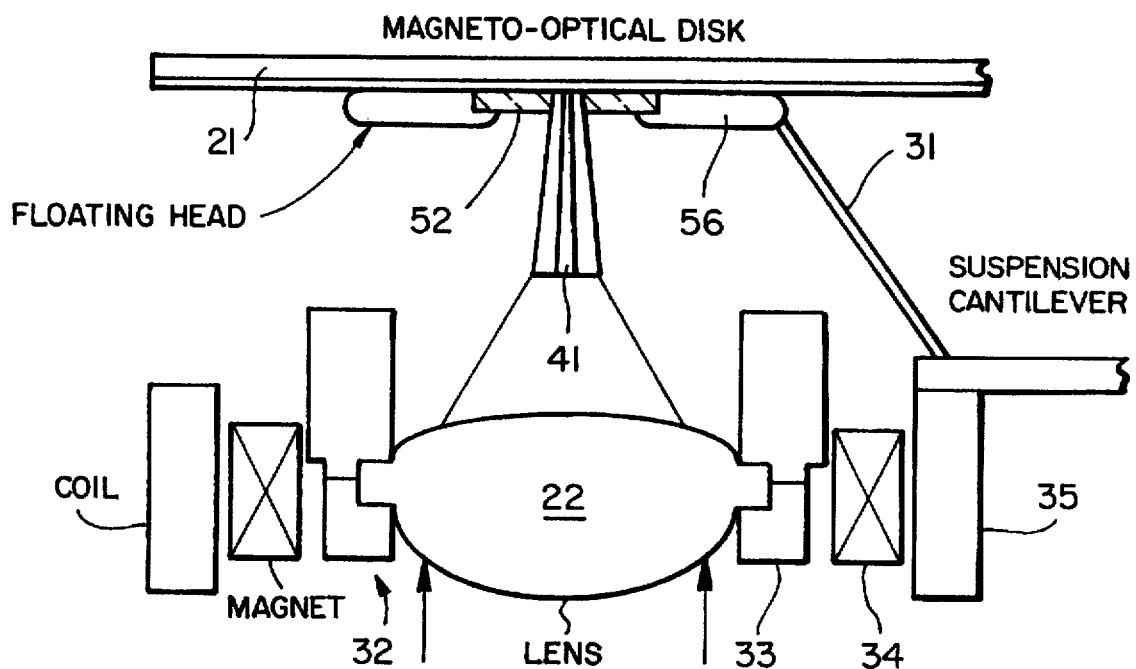
FIG_10
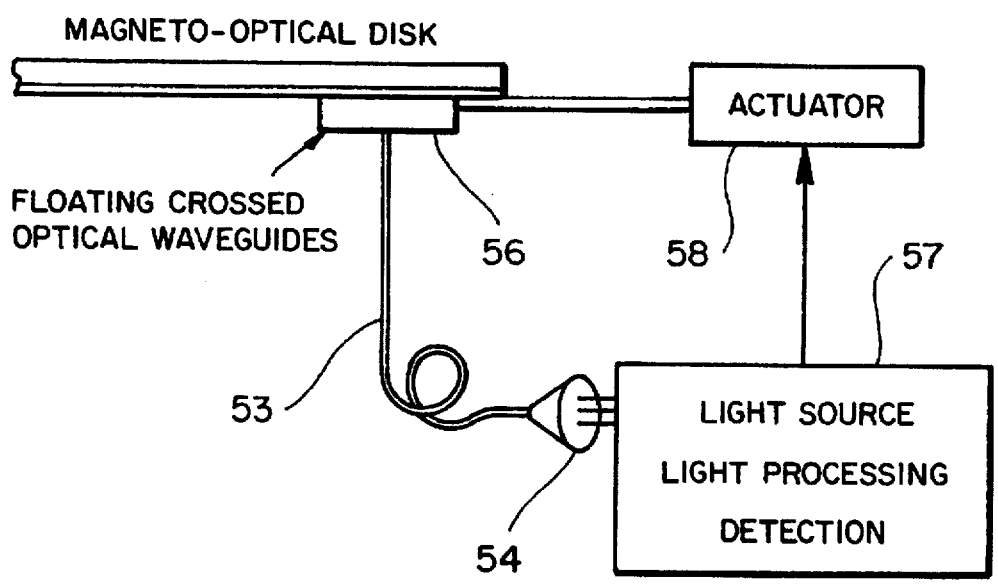
FIG_11

MAGNETO-OPTIC RECORDING SYSTEM EMPLOYING NEAR FIELD OPTICS

SUMMARY OF THE INVENTION

This invention relates generally to a magneto-optical recording system employing near-field optics and more particularly to a magneto-optical recording system which employs cross-tapered rectangular optical waveguides each terminating in a narrow tip to direct light waves to the narrow tip where evanescent optical fields are coupled to an associated magnetic film and for transmitting light from the film reflected into the narrow tip.

BACKGROUND OF THE INVENTION

In magneto-optic recording systems, digital information is stored in a thin magnetic storage medium by locally magnetized regions or domains. The regions are magnetized to represent either ones or zeros. The information is written into the magnetic storage medium by raising the temperature of localized small regions of the magnetic medium to the Curie point temperature of the medium at the localized regions. This lowers the coercivity to a point which enables orientation of the magnetic domain by an external magnetic field. The size of the regions or domains determine the density of the digital information. The size of the localized region is limited by diffraction and is marginally improved by use of shorter wavelengths of light and higher numerical aperture lens. Stored information is read by Kerr or Faraday rotation of a polarized light beam incident on the magnetic medium by the magnetic fields at the magnetized regions or domains. The shift in polarization is in the order of 1 degree. This shift is employed to detect ones and zeros. Systems for reading out these small rotational changes are well established in the optical storage industry. Optical recording and the design of conventional read/write heads is described in the book entitled "Optical Recording" authored by Alan B. Marchant, Addison-Wesley Publishing, 1990.

Betzig and others have overcome the diffraction limitation definition by employing near-field optics. They have demonstrated orders of twenty nm or better for the magnetized regions or domains. (E. Betzig, J. K. Trautman, R. Wolfe, P. L. Finn, M. H. Kryder and C. H. Chang, "Near-Field Magneto-Optics and Hi-Density Data Storage", Appl. Phys. Lett. 61, 142–144, (1992)). The basic idea of near-field optics is to pass an optical beam into a metal covered optical fiber which is tapered down to a small size with a pinhole at its end. If this pinhole is placed close to the object being illuminated or imaged, in this instance the magnetic media, the definition is controlled by the size of the pinhole, rather by diffraction limits.

The problem with the use of a tapered fiber is that it does not propagate waves in the region where the diameter of the fiber is less than approximately 0.3 wavelengths of the light. Propagation through wave guide in this region is cut off and the loss of energy is extremely high, of the order of 30 dBs. Thus the amount of light energy which is applied to the medium is limited and heating of the medium to the Curie temperature requires a finite time. This makes it impractical for use with high speed storage systems. For example, with light penetration into the magnetic media of about 15 nm and an illumination wavelength of 546 nm, using quartz with fiber reflective index of 1.5, the minimum effective size of the beam in the propagating region of the quartz fiber is 140 nm. If the fiber is tapered to a size much smaller than this amount, the attenuation in the cutoff region is very high. Because of this high attenuation, the technique is unsuitable for optical storage at high data rates.

OBJECT AND SUMMARY OF THE INVENTION

It is an object of the present invention to provide a magneto-optic recording system having an improved optical head for providing high intensity evanescent optical fields to a magnetic recording media.

It is another object of the present invention to provide an optical head which employs crossed tapered rectangular optical waveguides for transmitting light to a recording medium and for receiving light reflected therefrom.

It is a further object of the present invention to provide a magneto-optic recording system which employs crossed tapered rectangular optical waveguides which provide high intensity evanescent fields which heat the magnetic material at the intersection of the waveguides.

The foregoing and other objects of the invention are achieved by a magneto-optic recording system employing near-field optics including a read/write head assembly, for reading or writing information on a magnetic recording medium which includes crossed tapered optical waveguides, each terminating in a slit to couple light waves between the waveguide and magnetic medium.

BRIEF DESCRIPTION OF THE DRAWINGS

The foregoing and other objects of the invention will be more clearly understood from the following description when read in conjunction with the following drawings.

FIG. 1 is an perspective view of tapered rectangular optical waveguide.

FIG. 2 shows a tapered rectangular optical waveguide formed in a silicon wafer.

FIGS. 3A and 3B are sectional views take along line 3—3 of FIG. 2 showing the angles of inclination of the tapered waveguide and an impinging focused light beams having different convergence angles.

FIG. 4 shows a magneto-optic recording system employing tapered crossed waveguides in accordance with the present invention.

FIG. 5 is an enlarged view in more detail of the portion 5—5 of the recording system.

FIG. 6 shows the relative output of a rectangular waveguide as a function of the waveguide thickness and width.

FIG. 7 is a perspective view of the crossed tapered optical waveguides of FIGS. 4 and 5.

FIG. 8 is a bottom view of the crossed tapered optical waveguides of FIG. 7 illustrating the E-fields.

FIG. 9 shows the glass fiber thickness and an outside which is roughly circular but is tapered. The inner cross is shown as a dashed line.

FIG. 10 shows a magneto-optic recording system employing the crossed tapered waveguides of FIG. 9.

FIG. 11 shows a magneto-optic recording system employing crossed tapered waveguides with the light provided by a flexible optical fiber waveguide.

DESCRIPTION OF PREFERRED EMBODIMENT

In accordance with the present invention, a tapered rectangular or elliptical optical waveguide which terminates in a narrow slit is used instead of a tapered optical waveguide which terminates in a round aperture. Referring to FIG. 1, the rectangular waveguide 11 transmits the $TE_{10}$ mode with the E-fields 12 directed normal to the upper and lower metal surfaces 13 and 14. As is well known, the waveguide can be tapered to a narrow slit "b" without cutting off the E-fields 12 if the width of the guide, width "a", is greater than ½ the wavelength of the light waves in the material filling the guide (S. Ramo, J. R. Whinnery and T. VanDuzer, "Fields and Waves in Communication Electronics", 3rd edition, chapter 8, Wiley 1994). It will be apparent to one skilled in the art that the waveguide may be elliptical and have rounded ends as long as the width is greater than approximately ½ the wavelength of the light in the medium filling the guide. Thus, unlike the prior art near field probes described above, all light impinging in the waveguide propagates to the end of the probe and high illumination efficiency and strong evanescent fields in the region beyond where the guide ends are obtained.

Referring to FIG. 2, a tapered waveguide 16 is shown formed in a silicon wafer 17. The tapered opening is formed by conventional masking and etching techniques. The walls of the tapered slit or waveguide 16 are metalized to minimize optical losses. The silicon wafer is made thin to minimize losses in the waveguide. As will be described, the silicon substrate is made part of a flying head so that it floats on the rotating magnetic disk. The angle of the beam impinging in the slit is made approximately equal to the taper angle of the slit and the beam is made slightly smaller than the receiving end of the waveguide so that the beam does not impinge on the walls of the slit until the width decreases no further because of diffraction. Ideally, a large aperture lens is used so that the beam tapers down to a small size before hitting the edges of the waveguide or slit. With the use of silicon, it is convenient to etch with KOH, from the <100> surface, to form <111> planes, 18, at an angle of 36° to the vertical, shown in FIG. 3a. In this case, it is not desirable to make the convergence angle of the beam greater than 36° from the vertical, for there will then be shadowing of the beam by the silicon taper, as shown in FIG. 3b, as well as multiple reflections of the beam at the taper 18c. The minimum size of the beam without the taper present would then be $\lambda/2n \sin(36°)$, where n is the refractive index of the medium. However, with the taper present, the beam can be made much smaller, provided that the inside of the taper is coated with metal and the fields are polarized across the taper. As noted above, the slit must be at least a half wavelength long for the media field filling the slit. For 546 nm wavelength light and an air filled slit, the length of the slit would be about 273 nm. With a longer slit, several tracks could be detected. For instance, with a 820 nm long slit facing the disk, one can detect three tracks. On the other hand, the slit can be tapered down to a fraction of a wavelength in the track direction without suffering much loss. For example, the slit might be in the order of 50 nm wide. Ideally, the slit or waveguide would be filled with silicon nitride to decrease the effective wavelength by a factor of two. Alternatively, a plastic with a refractive index of 1.5 can be used. This would enable one to decrease all dimensions by a factor of 2 or 1.5 and thereby provide an even narrower slit.

This is merely one example of how the slit can be made. Another possibility is to fill the silicon tapered slit with silicon nitride and etch the silicon away leaving a silicon nitride probe which can be covered with metal except on its bottom surface.

A magneto-optic recording system employing an optical head in accordance with the present invention is schematically illustrated in FIGS. 4 and 5. Data is recorded on and read from a magneto-optical disk 21. The disk may for example, have a magneto-optic film deposited on its front surface with a silicon nitride layer typically of the order of 50 nm thick laid down on top of the magnetic layer for protection and for optimizing the field distribution. Typically, the magneto-optic film may have a silicon nitride backing on aluminum. As with more conventional systems, a good example of a suitable magneto-optic material would be TbFeCo.

The optical head includes a focusing lens 22 which focuses light 23 into crossed tapered optical slit or waveguide 17 of the type described with reference to FIGS. 2 and 3. As described above, the length of the slit is greater than ½ wavelength in the material filling the guide, however, the width can be much smaller. A crossed waveguide wafer 17 is shown in FIGS. 7 and 8. It should be realized that the slits and waveguides are magnified. The light source excites a $TE_{01}$ mode on the vertical slit 16b with its long axis in the track direction, the direction of the magnetic tracks, with the principle E-field in the cross track direction. As described above, the guide can be tapered down in the cross track direction without the mode being cut-off providing that its length in the track direction is greater than a half wavelength in the material filling the guide. The second waveguide with its long axis 16a in the cross track direction will support a $TE_{10}$ mode with the principal E-field in the track direction. When information is to be stored or written on the magneto-optic material, both slits are illuminated so that the near fields at the crossing of the waveguides is of sufficient intensity to raise the temperature of the magneto-optic material above the Curie temperature. This can be done either by rotating the polarizer 26 in front of the light source laser 27 or by inserting a half waveplate 28 with its principle axis at 45 degrees with respect to the input polarization of the laser so that the polarization is rotated 45 degrees and both slits are excited. If the laser is unpolarized, then removing the polarizer and quarter wavelength would do just as well. The input power from the laser must be carefully controlled so that the beam through one slit alone does not provide evanescent (near) fields having sufficient intensity to heat the magneto-optic material to its Curie point. However, the light at the crossover region (the spot) has double the intensity and raises the temperature above the Curie point. The applied magnetic field will then form a well defined magnetic domain. It is clear that the crossover area may be fractions of a wavelength in area. Data is recorded by modulating the laser as the disk rotates.

FIG. 5 is an enlarged view of the magneto-optical disk and the recording head assembly. The silicon member 17 is carried on a suspension 31 from a cantilevered head actuator (not shown). The focusing lens 22 is held by support 33 and positioned by an electromagnetic assembly 32 including permanent magnets 34 and coils 35 to maintain its focus in the waveguides. Operation of the focusing of the magnetic head and the positioning of the head are well known and will not be further described.

In order to read the recorded data stored as magnetic domains, the polarizer is rotated to provide polarized light which excites the cross track waveguide 16a to provide E-fields 36, FIG. 8, in the track direction. A magnetic domain on the magneto-optical disk rotates the plane of polarization of the reflected wave. The E-field 37 in the cross track direction is picked up by the vertical slit 16b. Furthermore, the tapered slit 16a in the cross track direction can detect the directly reflected light component for tracking and locating the recording head.

The definition of the system both for recording and reading is dictated by the area of the crossover of the two slits. Slit lengths should be kept as small as possible for the sensitivity depends on the ratio of this area to the area of one slit. That is, if "a", FIGS. 1 and 2 is the length of the slit and "b" is its width, its sensitivity is reduced by approximately b/a or more exactly by $0.5[b/a+\sin(\pi b/a)/\pi]$ since the variation in the fields along the length of the slit is sinusoidal. This function is plotted in FIG. 6.

In the receiving mode, the receiving slit or waveguide is aligned to receive the rotated polarized light. The light travels back through the objective lens 22 and is deflected by the beam splitter 37. If the directly reflected signal is of amplitude A, and the rotated component of value B, by using a half wave phase plate 38 followed by a polarizing beam splitter 39, signals are provided to detectors 1 and 2. The values of the signals are $(A+B)^2$ and $(A-B)^2$. The difference of these signals is proportional to 2AB and thus proportional to the amplitude of the rotated component. Since $A^2 >> B^2$, the sum of the two signals would be essentially $A^2$. One of the detectors can have two or more photo-transducers and can be used for tracking and focusing.

The crossed waveguides described above are formed in a semiconductor wafer by masking and etching the wafer. They need not necessarily be of the same length. For instance, in FIG. 7, the vertical guide 16b needs only to be a half wavelength long while the horizontal guide 16a may be longer for tracking purposes. These lengths may be controlled by suitable masking of the silicon before etching with an anisotropic KOH etch. It is apparent that the tapered waveguides would be formed by shaping an optical fiber. Referring to FIG. 9, a tapered shaped optical fiber 40 is shown with a shaped core 41. The optical fiber core 41 is shaped in the form of a cross to terminate in crossed narrow slits 42 and 43. Each of the slits is fed by a tapered waveguide 46 and 47 respectively. The width of the waveguide defined by the ribs is greater than ½ wavelength in the material filling the guide at the operating wavelength. The thickness can be fractions of a wavelength whereby the crossing area 51 can be very small.

The fiber optic waveguide can be used in place of the wafer 17. Its end is supported by a support 52 which forms a floating support. The lens 22 illuminates the large end of the fiber optic waveguide. Other than the above substitution, the magneto-optic recording system operates as described with reference to FIGS. 4 and 5 and like reference numerals have been applied.

The light can be applied to the crossed tapered waveguides by a fiber optic cable. Referring to FIG. 11, a fiber optic cable 53 receives light from focusing lens 54 and applies the transmitted light to the crossed tapered waveguides carried by floating head 56. The other optical components comprising the light source, beam splitters, polarizers, half wave plates, etc., are located remote from the floating head 56, represented by the box 57. The floating head can be very light presenting low inertia positioning by the actuator 58. The optical components and their operation is described above and is also well known. Alignment of the system is now easy, since standard fiber-optic components can be used to insert the light into the fiber, and the taper is used to make the beam as small as is required, with metal coating on the fiber. Note that just as with the silicon taper, the input beam may be circular, but smaller in diameter than the length of the input slot. Tapering of the slot length and width can then be used to shape the beam. The use of the flexible cable greatly simplifies the construction of the magneto-optic recording system.

Thus, there has been provided a high density magneto-optical recording system in which the size of the magnetic domains is not diffraction limited.

What is claimed is:

1. In a magneto-optic recording system employing near field optics; a read/write head assembly for reading or writing information on an adjacent magnetic recording medium, said read/write head assembly including crossed tapered optical waveguides which terminate in a slit having a length greater than one-half the wavelength of light in the media filling the waveguides and a width substantially less than the wavelength of light in the media filling the waveguides.

2. A read/write head assembly for reading/writing information in a magnetic storage medium;

including a pair of crossed tapered, substantially rectangular optical waveguides, each terminating in a slit, said optical waveguides each having a length which is greater than one-half wavelength of the light being transmitted in the medium filing the waveguide and a width substantially less than the wavelength of light in the medium filling the guide; and, a source of light for directing light of predetermined wavelength into at least one of said optical waveguides to provide E-fields extending outwardly from said slit, and means for positioning of said slit adjacent to the magnetic storage medium so that the E-fields are coupled to said magnetic storage medium.

3. A read/write head assembly as in claim 2 in which the other waveguide receives reflected light which has been rotated by magnetic fields in said recording medium.

4. A read/write head assembly as in claim 2 in which the source of light projects light into both of said rectangular waveguides, said light having an intensity which is not sufficient to heat the magnetic medium above Curie temperature at either slit, but which is sufficient to heat the magnetic medium above the Curie point when summed at the crossing of the slits.

5. A read/write head assembly as in claim 2 in which the crossed tapered waveguides are formed in a wafer of semiconductor material.

6. A read/write head assembly as in claim 5 in which the tapered waveguides are filled with a material having a high index of refraction.

7. A read/write head assembly as in claim 2 in which the crossed tapered waveguides are formed by shaping an optical fiber.

8. A read/write assembly for reading/writing information in a magnetic media, including:

a read/write head having a pair of crossed, substantially rectangular waveguides each of which tapers at a predetermined angle to terminate in a slit, said slits each having a length which is greater than one-half wavelength of the light being transmitted in the medium filling the waveguide and a width substantially less than the wavelength of the light transmitted in the medium filling the waveguide, a source of light of predetermined wavelength, lens means for receiving light from the source of light and forming and directing a tapered light beam which tapers into at least one of said optical waveguides to provide E-fields extending outwardly from said slit, and means for positioning said head adjacent to the magnetic storage medium so that the E-fields at the slit are coupled to said magnetic storage medium.

9. A read/write assembly as in claim 8 in which said crossed waveguides are formed in silicon.

10. A read/write assembly as in claim 8 in which the beam tapers at an angle equal to or less than the taper angle of the waveguide.

11. A read/write assembly as in claim 8 in which the lens is a large aperture lens.

12. A read/write assembly as in claims 10 or 11 in which the tapered beam is smaller than the waveguide so that the beam does not impinge on the waveguide until the dimension of the beam cannot further decrease because of diffraction.

13. A read/write optical assembly as in claim 8, 9, 10, 11 in which one waveguide receives reflected right which has been rotated by magnetic fields in said recording medium.

14. A read/write head assembly as in claim 8 in which the source of light projects light into both of said rectangular waveguides, said light having an intensity which is not sufficient to heat the magnetic medium above Curie temperature at either slit but which is sufficient to heat the magnetic medium above the Curie point where the slits cross.

15. A read/write assembly as in claim 8 in which the crossed tapered waveguides are formed in a wafer of semiconductor material.

16. A read/write assembly as in claim 15 in which the tapered waveguides are filled with a material having a high index of refraction.

17. A read/write optical assembly as in claim 12 in which one waveguide receives reflected right which has been rotated by magnetic fields in said recording medium.

* * * * *